United States Patent [19]

Komoda et al.

[11] Patent Number: 4,476,080
[45] Date of Patent: Oct. 9, 1984

[54] METHOD AND APPARATUS FOR PRODUCING A MULTI-LAYER LAMINATED RESIN FILM

[75] Inventors: Hirohisa Komoda, Kanagawa; Masatomo Ishihara, Tokyo, both of Japan

[73] Assignees: Toyo Seikan Kaisha Ltd.; Tokan Kogyo Co. Ltd., both of Japan

[21] Appl. No.: 493,253

[22] Filed: May 10, 1983

Related U.S. Application Data

[62] Division of Ser. No. 258,916, Apr. 30, 1981, Pat. No. 4,410,602.

[30] Foreign Application Priority Data

May 8, 1980 [JP] Japan .................................. 55-59977

[51] Int. Cl.$^3$ .......................... B28B 3/20; B29D 7/02; B32B 31/06
[52] U.S. Cl. ........................... 264/176 R; 156/244.11; 156/244.12; 156/244.13; 156/244.22; 156/500; 264/37; 425/131.1; 425/133.1; 425/133.5
[58] Field of Search ...................... 156/244.11, 244.12, 156/244.13, 244.22, 500; 264/37, 38, 176 R, 177 R, 209.8; 425/131.1, 133.1, 133.5, 462; 428/516

[56] References Cited

U.S. PATENT DOCUMENTS

| | | | |
|---|---|---|---|
| 3,477,099 | 11/1969 | Lee et al. | 425/133.5 |
| 3,743,459 | 7/1973 | Shrenk et al. | 425/133.5 |
| 3,918,865 | 11/1975 | Nissel | 425/131.1 |
| 3,959,431 | 5/1976 | Nissel | 425/133.5 |
| 4,118,166 | 10/1978 | Bartrum | 425/133.5 |
| 4,234,663 | 11/1980 | Catté et al. | 264/37 |
| 4,287,147 | 9/1981 | Hungerford | 264/37 |
| 4,402,889 | 9/1983 | Bonis | 425/133.5 |

FOREIGN PATENT DOCUMENTS

5081156 6/1980 Japan .

Primary Examiner—Caleb Weston
Attorney, Agent, or Firm—Charles A. Brown

[57] ABSTRACT

A multi-layer laminated resin film comprising top and bottom outer laminates of sandwich structure each including a layer of reclaimed synthetic resin mixture entirely surrounded by a second fresh resin layer and an inner layer interposed between and secured to the inside surface of the top and bottom laminates.

A process for producing a multi-layer laminated resin film using reclaimed resin mixture in which a first resin of reclaimed synthetic resin mixture is fed into a first composite die in a first direction, a second resin of fresh resin is fed into the first composite die in a second direction at right angles to the first direction to surround the first resin, adhesive is fed into a second composite die in a first direction and a third resin is fed into the second composite die in a second direction diametrically opposite to the first direction.

A device for producing a multi-layer laminated film using reclaimed resin mixture which comprises a series of composite dies connected in end-to-end relationship in which each of the composite dies includes upper and lower die portions, and first, second and third have extruder means associated therewith to feed different materials to the respective composite dies.

3 Claims, 6 Drawing Figures

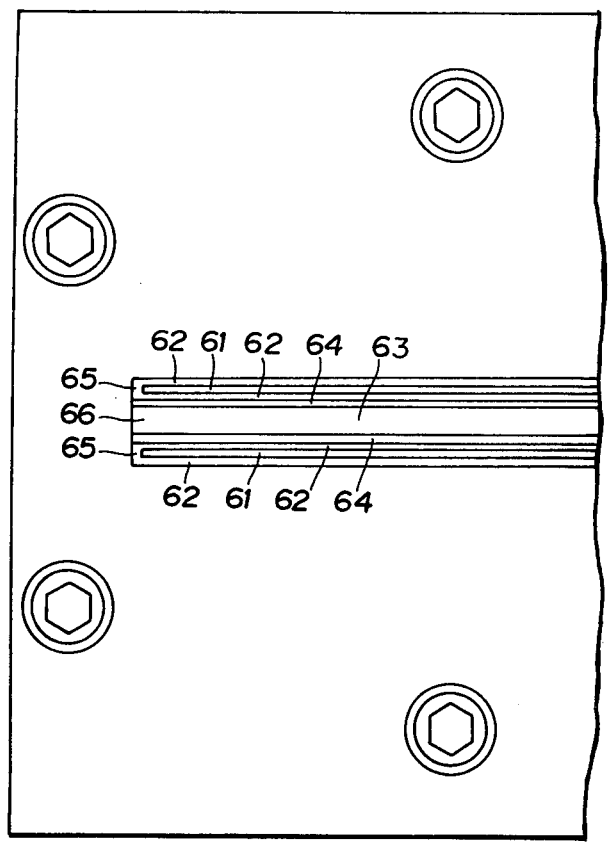

METHOD AND APPARATUS FOR PRODUCING A MULTI-LAYER LAMINATED RESIN FILM

This is a division of application Ser. No. 258,916 filed Apr. 30, 1981, now U.S. Pat. No. 4,410,602.

BACKGROUND OF THE INVENTION

This invention relates to a process and apparatus for forming a film or sheet-like product from thermoplastic synthetic resin compositions by the employment of the conventional extruders even when the resin compositions include reclaimed synthetic resins having relatively low thermal decomposition temperatures and more particularly, to a multilayer laminated resin which comprises top and bottom outer layers of sandwich structure each consisting of a first resin of reclaimed synthetic resin entirely surrounded by a second resin of fresh resin and an inner layer of a third resin having a property different from those of the above-mentioned two resins interposed between and secured to the top and bottom outer layers and a process and apparatus for producing the multi-layer laminated resin film.

Of late, synthetic resins have been required to have one or more of a variety of properties depending upon applications of such resins and these properties include moldability, transparence, printability, impact resistance, weather resistance, tensile strength, elongation, shearing strength, adhesion and gas permeability and novel resins have been developed to meet these requirements. However, difficulties have been encountered in producing resins having two or more of the above-mentioned properties and even when such resins were developed, they could not be commercially produced.

Thus, in order to meet the above-mentioned requirements, there have been proposed relatively less expensive laminated resin films which are excellent in some of the above-mentioned properties called for in resins and one example of these laminated resin films is a heat sealable auto-packing laminated resin film which comprises opposite outer layers formed of polyethylene having excellent heat sealing property and an inner layer formed of polyethylene having high recilience and tensile strength in a thin film form because the polyethylene forming the outer layers is insufficient in resilience and tensile strength. Alternatvely, there has been also proposed a laminated resin film which comprises opposite outer layers formed of polyethylene and an inner layer formed of vinylidene chloride of low gas permeability because the polyethylene forming the outer layers is excellent in heat sealing property, but high in gas permeability. When these laminated resin films formed of two or more different synthetic resins are employed in the producing of certain products, some rejects are inevitably produced and discarded as waste and when the laminated resin films are stamped to produce certain products, waste or scrap is produced.

And since the decomposition temperatures of various waste synthetic resin materials are in many cases lower than that of any one of laminated films formed of a plurality of different materials and the properties of such waste materials are unknown, such resin waste materials are discarded without being reclaimed.

SUMMARY OF THE INVENTION

Therefore, the present invention is to provide a novel and improved process and apparatus which can produce a multi-layer laminated resin film by the utilization of waste synthetic resin materials which up to now have been conventionally discarded as waste and the properties of which are known.

The present invention also provides a novel and improved multi-layer laminated resin film produced by the novel and improved process and apparatus.

The above and other objects and attendant advantages of the present invention will be more readily apparent to those skilled in the art from a reading of the following detailed description in conjunction with the accompanying drawings which show one preferred embodiment of the invention only for the purpose of illustration, but not for limiting the scope of the same.

BRIEF DESCRIPTION OF THE DRAWINGS

FIG. 6 is a longitudinally sectional view of the produced laminated resin film positioned in the leading end portion of the upper third die of the third composite die.

PREFERRED EMBODIMENT OF THE INVENTION

Figure 1:
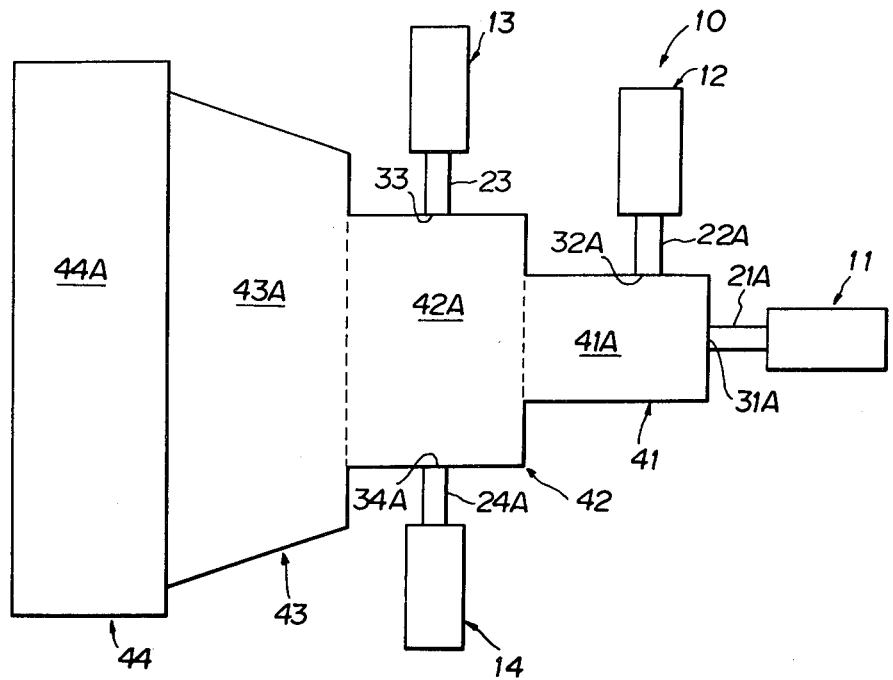
FIG. 1 is a schematic top plan view of one preferred embodiment of the device constructed in accordance with the present invention.
Figure 2:
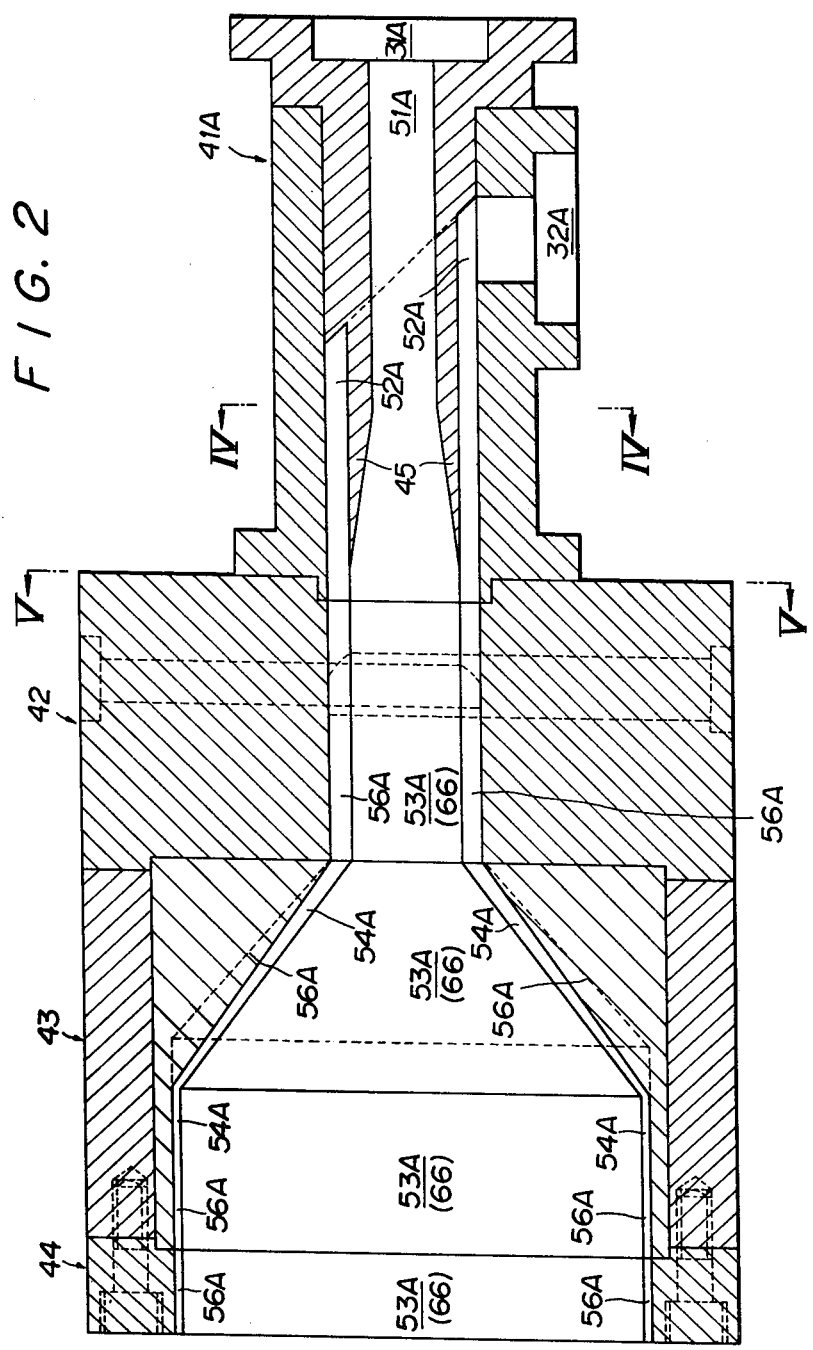
FIG. 2 is a top plan view in longitudinal section on an enlarged scale of the composite die assembly of said device showing the upper flow path arrangement defined therein.
Figure 3:
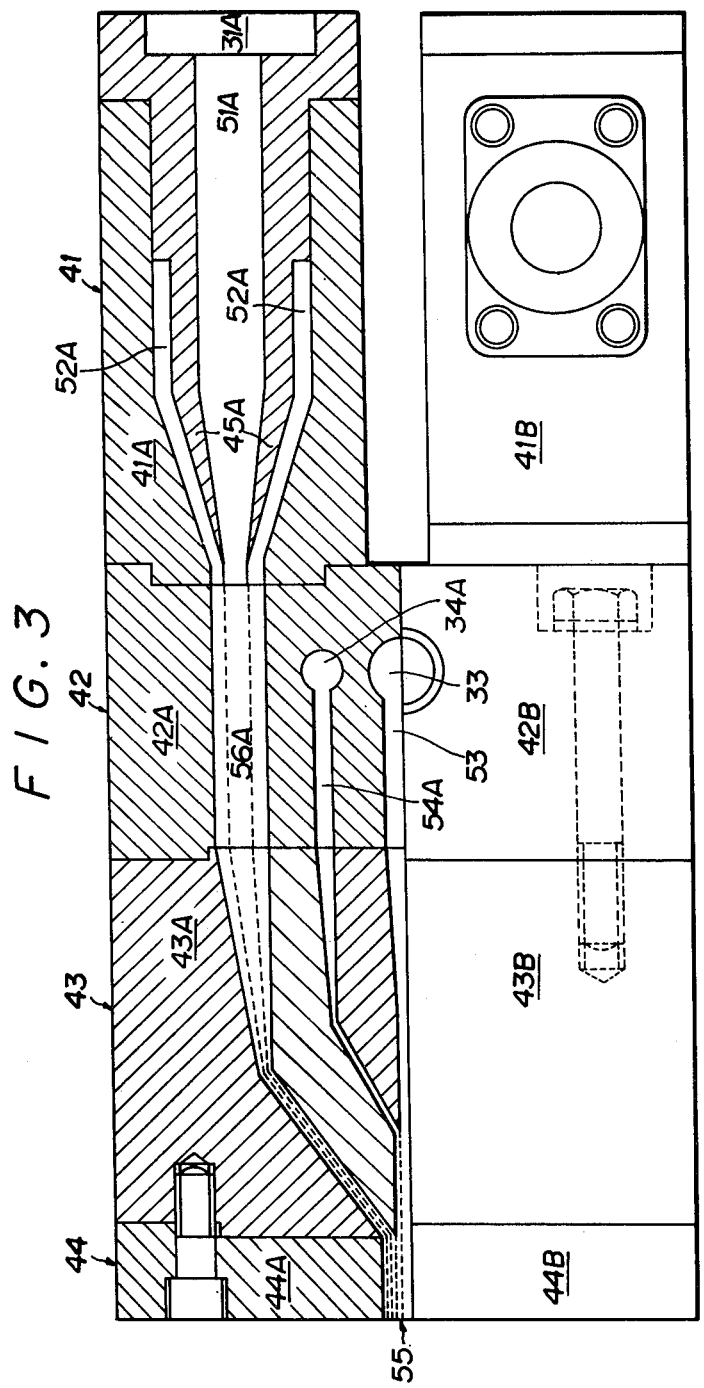
FIG. 3 is a fragmentary side elevational view on an enlarged scale of said device of FIG. 1 showing the upper half portion of said composite die assembly.

The present invention will be described in detail referring to the accompanying drawings, but first the following should be pointed out in connection with the drawings:

Although FIG. 1 is a schematic view of the device which incorporates a series of composite dies integrally connected together in end-to-end relationship as shown in FIGS. 2 and 3 therein to provide the operative effects contemplated by the present invention, some of the components of the device are eliminated from the showing of various Figures.

That is, among the series of dies as shown in FIG. 3, although a first composite die 41 comprises upper and lower first dies 41A, 41B adapted to be bolted to a second composite die 42, only the upper first die 41A of the first composite die 41 appears in FIG. 1, but the lower first die 41B is not seen in this Figure because the latter underlies the former.

A first induction pipe 21A shown in FIG. 1 in the upper pipe of a composite induction pipe which is branched into the upper first induction pipe 21A in communication with an upper first induction opening 31A in the upper first die 41A and a lower first induction pipe 21B (not shown) in communication with a lower first induction opening 31B (not shown) in the lower first die 41B. The lower first induction pipe 21B which communicates with the lower first induction opening 31B in the lower first die 41B does not appear in any one of the several Figures because the lower first induction pipe 21B underlies the upper first induction pipe 21A. Similarly, a second induction pipe 22A is also the upper induction pipe of a second composite induction pipe which is branched into the upper second induction pipe 22A in communication with an upper second induction opening 32A in the upper first die 41A and a lower second induction pipe 22B (not shown) in communication with a lower second induction opening 32B (not shown) in the lower first die 41B. The lower second induction pipe 22B in communication with the lower second induction opening 32B is not seen in any one of the several Figures.

And in FIG. 1, a fourth induction pipe 24A is an upper fourth induction pipe in communication at one end with a fourth induction opening 34A in the upper second die 42A of a second composite die 42 and at the other end with a fourth extruder 14 and a lower fourth induction pipe 24B (not shown) which is in communication with a fourth induction opening 34B (not shown) in the lower second die 42B of the second composite die 42 and is not seen in any of the several Figures because the induction pipe 24B underlies the above-mentioned upper fourth induction pipe 24A.

Therefore, the leading end of the upper first induction pipe 21A associated with a first extruder 11 is in communication with the upper first induction opening 31A in the upper first die 41A, the leading end of the upper second induction pipe 22A associated with a second extruder 12 is in communication with the upper second induction opening 32A in the upper first die 41A, the leading end of a third induction pipe 23 associated with a third extruder 13 is in communication with a third induction opening 33 positioned in the center of the second composite die 42 and the leading end of the fourth induction pipe 24A associated with a fourth extruder 14 is in communication with the upper fourth induction opening 34A in the second die 42A.

Figure 4:
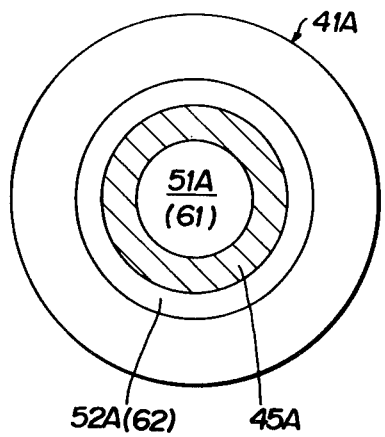
FIG. 4 is a cross sectional view taken along substantially along the line IV—IV and as seen in the arrow direction in FIG. 2 showing the upper first die of the first composite die together with the first and second flow paths defined therein.

As more clearly shown in FIG. 3, since the upper and lower dies of each composite die are identical with each other in construction, only the upper dies will be described hereinbelow with the understanding that the same is also applicable to the lower dies. The upper first induction opening 31A is in communication with an upper first through flow path 51A which extends along the longitudinal axis of the upper first die 41A and the upper second induction opening 32A is in communication with an upper second cylindrical flow path 52A which is coaxial with and surrounds the upper first flow path 51A. As more clearly shown in FIG. 4, the upper first flow path 51A and upper second flow path 52A are isolated from each other by an intervening cylindrical partition wall 45A. The thickness of the intervening bulk-partition wall head 45A positioned between the upper first flow path 51A and upper second flow path 52A gradually decreases towards the leading or inner end of the upper first die 41A and as more clearly shown in FIG. 3, the upper second flow path 52A merges into the outer periphery of the upper first flow path 51A at the leading end of the upper first die 41A and communicates with an upper converging flow path 56A in the upper second die 42A. The upper first die 41A and the lower first die 41B similar to the die 41A in construction are connected to the upper and lower second dies 42A and 42B of the second composite die 42, respectively and although not shown, the lower first flow path 51B and lower second cylindrical flow path 52B merge into a lower converging flow path 56B in the lower second die 42B. The second die 42 has a center induction opening 33 to which the third induction pipe 23 associated with a third extruder 13 is connected and upper and lower fourth induction openings 34A and 34B (not shown) are also provided in the second die 42 between the upper second die converging flow path 56A, and the lower second die converging flow path 56B and the upper and lower fourth induction pipes 24A and 24B associated with the fourth extruder 14 are connected to the upper and lower induction openings 34A and 34B, respectively.

A third flow path 53, an upper second die fourth flow path 56A and a lower second die flow path 54B extend from the third and fourth induction openings through the upper and lower second dies 42A, 42B to the leading end of the second composite die 42. As shown in FIG. 2, a third composite die 43 is connected at one end to the leading end of the second composite die 42 and takes the form of a fishtail die. In each of the upper and lower dies 43A and 43B of the third composite die 43, converging flow paths 56A, 56B, fourth flow paths 54A, 54B and a center flow path 53 extend laterally through the effective width of the third die 43 and at the leading end of the third composite die, the converging flow paths and third flow path merge with each other and connect to a fifth flow path 55 at the lip of a fourth composite die 44.

Figure 5:
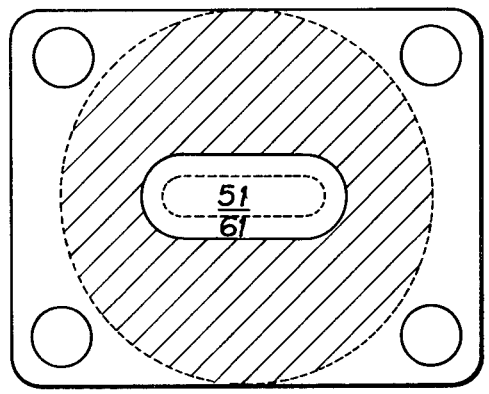
FIG. 5 is a cross-sectional view taken along substantially the line V—V and as seen in the arrow direction in FIG. 2 showing the resin flow path converging in the leading end portion of the upper first die of said first composite die.

With the above-mentioned construction and arrangement of the components of the laminated resin film producing device 10 of the present invention, the device operates as follows:

First of all, a charge of a mixture consisting of different reclaimed synthetic resins is melted in the first extruder 11 to become a first resin 61 and the molten first resin 61 is extruded under pressure from the extruder 11 into the upper and lower first induction pipes 21A and 21B from where the first resin flows into the upper and lower first dies 41A and 41B at the induction openings 31A and 31B therein, respectively. After having flowed into the upper and lower first dies 41A and 41B, the molten first resin 61 advances through the axial flow paths 51 in the two dies toward the leading end of the first die 41. A charge of fresh polyethylene is melted in the second extruder 12 to become a second resin 62 and the molten second resin is extruded under pressure from the extruder 12 into the second induction pipe 22 from where the second resin 62 flows into the upper and lower first dies 41A and 41B of the first composite die 41 at the upper and lower second induction opening 32A and 32B therein. After having flowed into the upper and lower first dies 41A and 41B, the molten second resin 62 flows through the upper and lower second cylindrical flow paths 52A, 52B isolated from the first resin 61 flowing through the upper and lower first flow paths 51A, 51B by means of the cylindrical partition wall 45 and as the second resin 62 flows through the flow paths 52A, 52B, the resin is gradually formed into a hollow cylindrical shape (see FIG. 4). At the leading end of the first composite die 41, the cylindrical second resin 62 merges with the outer periphery of the solid cylindrical first resin 61 and advances into the laminating flow paths 56A and 56B in the upper and lower second dies 42A and 42B of the second composite die 42 together with the two flows of the first resin 61 surrounded by the two or upper and lower flows of the second resin 62. In the laminating flow paths 56A, 56B, the two resins 61, 62 are laminated one upon another while being flattened by the particular configuration of the laminating flow paths as shown in FIG. 5. While the laminated resins are present in the second die 42, a saponification ethylene - vinyl acetate copolymer of low gas permeability is melted in the third extruder 13 to become a third resin 63 and the molten copolymer is extruded from the extruder 13 into the third induction pipe 23 from where the resin 63 flows into the second die 42 at the center induction opening 33 therein.

Meantime, adhesive 64 is extruded from the fourth extruder 14 into the upper and lower second dies 42A, 42B at the upper and lower fourth induction openings 34A, 34B therein, respectively. In this way, the second resin 62 surrounding and merged with the first resin 61, the third resin 63 and the adhesive 64 then flow into the fishtail-shaped flow paths in the upper and lower third dies 43A and 43B of the third composite die and spread to the full effective width of the particular shape of the fishtail paths having a predetermined depth. The resins and adhesive then flow into the converging fifth flow path commonly formed in the upper and lower fourth dies 44A and 44B of the composite fourth die 44 to be formed into a multilayer laminated film.

Therefore, as more clearly shown in FIGS. 3 and 5, since the first resin 61 is formed being surrounded on the opposite surfaces and at the opposite ends thereof or on the entire periphery by the second resin 62 in the second and third composite dies 42, 43, even when the first resin 61 consists of reclaimed resin of relatively low decomposition temperature, the first resin 61 is not directly subjected to the heat from the second and third composite dies 42, 43 by the presence of the intervening second resin consisting of fresh polyethylene of relatively high decomposition temperature. Thus, even when the second and third composite dies are maintained at a relatively high temperature which is suitable for melting the third resin 63, but higher than the decomposition temperature of the first resin 61, the first resin 61 can be formed without being decomposed.

Therefore, a multi-layer laminated film as shown in FIG. 6 can be easily and positively produced without decomposing the reclaimed synthetic resin and the multilayer laminated film integrally comprises top and bottom composite outer layers 65, 65 each including the first resin 61 of reclaimed resin mixture sandwiched or surrounded by the second resin 62 of fresh polyethylene having high heat shielding capability, and an inner layer 66 formed of a third resin 63 of low gas permeable saponification ethylene-vinyl acetate copolymer, interposed between the top and bottom outer layers 65 and secured to the outer layers by the adhesive 64. The thus produced multi-layer laminated film exhibits excellent heat shielding capability by virtue of the polyethylene forming the top and bottom outer layers and also has low gas permeability due to the saponification ethylene-vinyl acetate copolymer forming the inner layer and is a most suitable film for use in food packages to be sealed.

As is clear from the foregoing description of the preferred embodiment of the invention, according to the present invention, the first resin of reclaimed resin mixture is fed under pressure into the axial first flow paths in the upper and lower dies of the first composite die, the second resin of fresh polyethylene is fed under pressure into the upper and lower second flow paths surrounding the axial first flow path in a peripherally spaced relationship to the latter so that the second resin forms a hollow cylindrical shape surrounding the first resin in a peripherally spaced relationship to the latter, the first and second resins advance through their respective flow paths maintaining the surrounding relationship to the leading end of the first composite die where the second resin merges in to the periphery of the first resin to form the top and bottom outer layers, the third resin is fed under pressure into the upper and lower third flow paths in the upper and lower second dies of the second composite die via the upper and lower induction openings in the left-hand and right-hand sides of the die to form the inner layer to be positioned between the top and bottom outer layers, the first, second and third resins advance into the third composite die where the top and bottom outer layers and the inner layer are flattened or reduced in thickness in the separate flow paths and secured together under heating to thereby produce the multi-layer laminated film. Since the first resin consisting of reclaimed resin mixture is entirely surrounded by the second resin consisting of fresh polyethylene resin, the first resin can be formed without thermal decomposition.

Thus, according to the present invention, even when the first resin consists of reclaimed resin mixtures consisting of two or more different resins, the present invention can be effectively applied.

In the foregoing, description has been made of only one specific embodiment of the invention, but it will readily occur to those skilled in the art that the same is illustrative in nature, and does not limit the scope of the invention in any way. The scope of the invention is determined by the foregoing claims.

What is claimed is:

1. A process for producing a multilayer laminated resin film comprising the steps of:
    feeding a reclaimed synthetic resin mixture under pressure as a first resin into an axial first flow path in each of upper and lower first dies,
    feeding a virgin polyethylene resin under pressure as a second resin into a second flow path in each of the upper and lower first dies to form the second resin into a hollow cylindrical shape about said first resin so as to surround the first resin,
    flattening the first and second resins and forming a sandwich structure having top and bottom outer layers of the second resin and a middle layer of the first resin in each of the upper and lower second dies to form flattened laminated outer layers,
    feeding low gas permeable saponification ethylene-vinyl acetate copolymer as a third resin into a center induction opening on the opposite sides of the second dies to form an inner layer between the laminated outer layers, the second dies being located downstream of the first dies, and
    flattening the laminated top and bottom outer layers and the inner layer to a predetermined thickness and securing the laminated outer layers to top and bottom surfaces of the inner layer by an adhesive in a third die located downstream of the second die.

2. The process according to claim 1 further including the step of feeding the adhesive to an intermediate portion of the outer layer and the inner layer in each of the upper and lower second dies.

3. A device for producing a multi-layer laminated resin film comprising first, second and third composite dies connected together in end-to-end relationship;
    said first composite die including upper and lower first dies having the same construction, each having a first induction opening at one end, a first axial flow path in communication with said first induction opening, a cylindrical second flow path surrounding said first flow path in periperally spaced relationship to said first flow path, a second induction opening formed in one side of said first composite die in communication with said second cylindrical flow path, and a converging flow path at one end of said first composite die where said second cylindrical path merges with said first flow path;

said second composite die including upper and lower second dies provided with outer flow paths in communication with said converging flow paths of said upper and lower first dies, a third flow path in spaced relation to said outer flow paths, fourth flow paths disposed between said outer flow paths and said third flow path, and third and fourth induction openings being formed in opposite sides of said second composite die and being connected to said third and fourth flow paths respectively; said third composite die including upper and lower third dies having an up-stream portion and a down-stream portion, said third composite die being provided with flow paths at said up-stream portion in communication with said outer flow paths, third flow path and fourth flow paths of said second composite die and converging to a single flow path at said down-stream portion with said converging single flow path having a width larger than that of said second composite die which has a width larger than that of said first composite die, and first, second, third and fourth extruders being in communication with said first, second, third and fourth induction openings to extrude reclaimed synthetic resin mixture, virgin PE resin, low gas permeable saponification ethylene-vinyl acetate copolymer and adhesive respectively.

* * * * *